Figure 1:
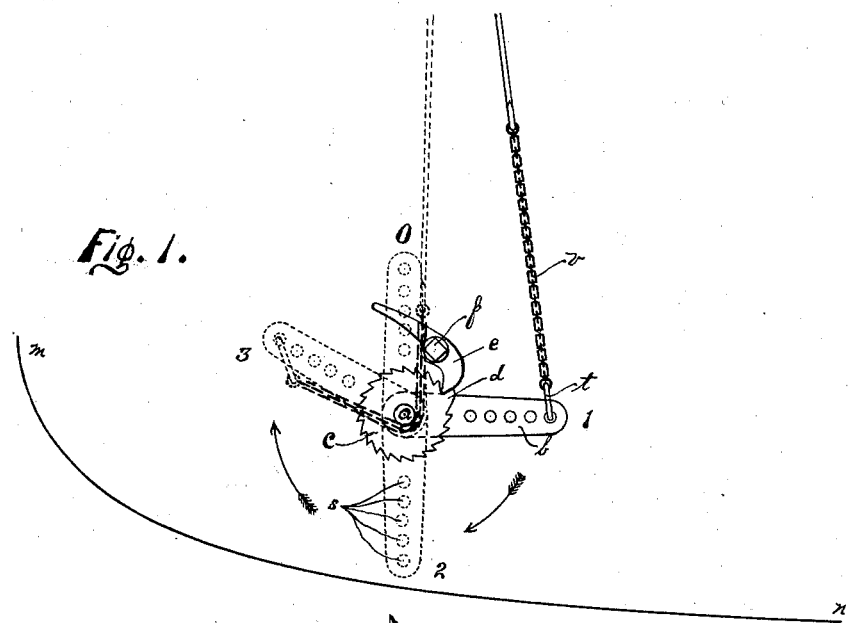

No. 656,574. Patented Aug. 21, 1900.
H. H. ABERNATHY.
BRAKE.
(Application filed Nov. 29, 1899.)

(No Model.)

Witnesses —

Inventor —
Hugh H. Abernathy

THE NORRIS PETERS CO., PHOTO-LITHO., WASHINGTON, D. C.

UNITED STATES PATENT OFFICE.

HUGH H. ABERNATHY, OF CHICAGO, ILLINOIS, ASSIGNOR OF ONE-HALF TO L. P. INGERSOLL, OF NEW YORK, N. Y.

BRAKE.

SPECIFICATION forming part of Letters Patent No. 656,574, dated August 21, 1900.

Application filed November 29, 1899. Serial No. 738,676. (No model.)

*To all whom it may concern:*

Be it known that I, HUGH H. ABERNATHY, a citizen of the United States, and a resident of Chicago, in the county of Cook and State of Illinois, have invented certain new and useful Improvements in Brakes, of which the following is a specification.

My invention relates to a mechanical movement serviceable where a simple and effective construction is desired to remove slack in connections or do an initial light work quickly and at a low leverage, after which the power is applied at a higher and constant leverage. This principle is particularly applicable to what are commonly known as "chain-brakes," such as are at present in general use upon street-railway cars and other vehicles. It is immaterial whether the power is derived from the hand or other source or whether said application of power is direct or indirect upon the "staff" or "spindle" or "hub" or "drum," as it may be variously termed, about which the chain is wound in setting the brake. The present hand chain-brake in actual service requires from one to two and a half revolutions of the hand-crank and brake-staff to take up slack, lost motion, and spring of beams and connections before any material braking power is applied to the wheels. In the time required to make this movement a car traveling at the rate of ten to twelve miles per hour will move fifteen to twenty feet after a signal or warning to stop is given before the brakes can be placed in proper serviceable apposition to the wheels. To remedy this defect is the principal purpose of the improvement hereinafter described.

In its simplest form this improvement consists only of an arm (which I will hereinafter designate as the "slack-arm") protruding from the spindle, staff, hub, or drum, about which a chain or other flexible connection is wound in applying the brake, there being provision at or near the outer end of said slack-arm for attaching said flexible connection; secondly, the efficiency of slack-arm is enhanced by using it in conjunction with a ratchet-wheel having an enlarged tooth. Said slack-arm and ratchet-wheel are so relatively attached to said spindle or staff that when the enlarged tooth of the ratchet-wheel is in engagement with its dog the slack-arm stands normally and constantly at or near a right angle to the direction of required application of force or at any other more serviceable or convenient angle; thirdly, two or more slack-arms may be similarly attached to the same spindle or staff, by which construction two chains may be used, which may be of the same length, thus distributing the force, or they may be of slightly-different lengths, when should the shorter chain break under the strain the force will be transferred to the remaining longer chain, which not having had the wear and working strain before is now unimpaired, and the same result may be accomplished by using chains of the same length, but attaching them to their respective arms at different distances from the center of the spindle, or the arms may protrude from the spindle at slightly-different angles; fourthly, in cases where a greater power is desired than can be given by the hand-crank alone the above-named advantages are designed to be used in combination with a gear-wheel attached to the same spindle upon which are mounted said slack-arm and ratchet-wheel, and engaging in said gear-wheel is a pinion attached to the lower end of the hand-crank staff, said gear-wheel and pinion being so proportioned as to develop any required power upon said spindle.

Figure 2:
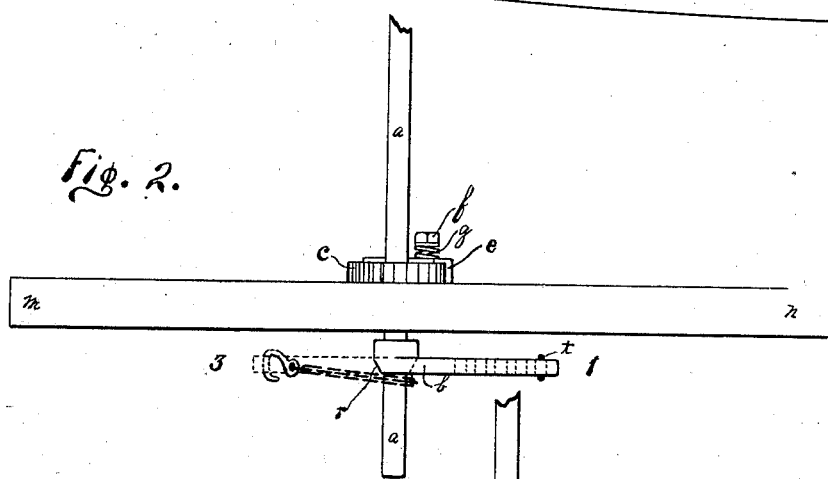
Figure 3:
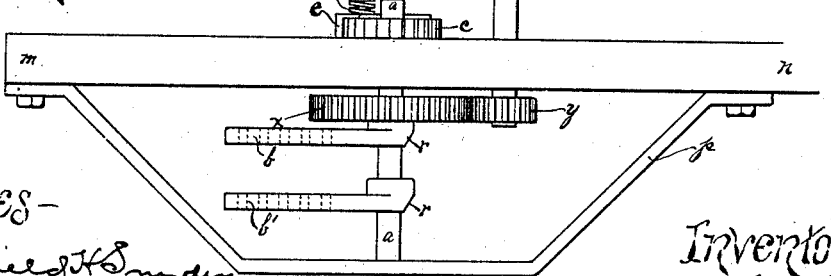

In the accompanying drawings, Figure 1 is a plan view showing the slack-arm in four positions. The line *m n* indicates the outline of the car-platform for the purpose of general location; but for clearness of lines the drawing disregards the presence of the platform. Fig. 2 is a front view of Fig. 1, showing the slack-arm in the normal first position and in the third position. The dash-board is not shown in any of the drawings. Fig. 3 is a front elevation illustrating the elements shown in Figs. 1 and 2 in combination with construction for additional chains, as above described, and the indirect application of power to spindle and slack-arms.

Referring to the drawings the same letter indicates the same part in all the figures.

*a* indicates the spindle, staff, hub, or drum, about which the chain is wound when applying the brake and attached to which are the ratchet-wheel c and at least one slack-arm b, while, as shown in Fig. 3, there is in addition attached a second slack-arm b' and gear-wheel x. In Fig. 2 spindle a is shown extended, in which case it is the lower end of the brake-staff, upon the top end of which is mounted the hand-crank. In Fig. 3, Z indicates the brake-staff, power from which is multiplied and transferred to a through the interposed pinion y and gear-wheel X.

b indicates the slack-arm, a projection of or attached to the spindle or staff a. In Fig. 1 this slack-arm is shown in four positions. Fig. 2 shows the same arm in position 1 and position 2 of Fig. 1. b is also shown in Fig. 3 in a position corresponding to position 1 in Fig. 1, where also is represented b', the duplicate of b and similarly placed. The positions are shown reversed, because the application of power is reversed by interposition of gearing.

c indicates the ratchet-wheel, which is mounted upon the same spindle or staff a, and is shown in all three drawings.

d indicates the enlarged tooth on the ratchet-wheel c. Said tooth d is not so large but that it may freely pass all points of the dog e, thus allowing for a full turn of the spindle or more if necessary, though with a proper adjustment a full revolution of the staff will never be required.

e indicates the dog, which is fastened to the platform by the bolt f. Between the head of the bolt f and the dog e is inserted a spring g, which is intended to hold said dog to the floor and prevent it from jarring out of position when not engaged.

m n indicate the car-platform.

p indicates a brace for the bottom of spindle a.

r indicates a bevel upon the spindle at drum a, intended as a guide for the chain, that it may be crowded from the path of arm b after slack-arm passes position 2.

s indicates several adjusting-holes in the slack-arm b.

t is a hook in end of connecting-chain v.

The operation of this improvement may be better understood by a general statement of the present condition of hand chain-brakes. Under the construction now in general use about eight inches of slack and lost motion are necessary to insure the car-wheels from being shoe-bound. When the brake is applied, this slack is taken up by winding it directly upon the bottom of the staff, which being small of circumference requires about a turn and a half of the staff for its removal. This improvement consists in a construction which will remove all of the above-mentioned slack and lost motion, whatever it may be, by one-half or any desired fraction less than one-half a revolution of said staff, preferably about one-quarter of a revolution, and this arc is regulated by the working length of the previously-described slack-arm. Assuming there are eight inches of slack and it is desired to take this up in a half-turn of the staff, then the hook t at the end of the connecting-chain v should be inserted in that adjusting-hole s in the slack-arm b which is four inches from the center of staff a, and when the brake is off the slack-arm b will be kept in the position 0 by the drag of the chain, no enlarged tooth of the ratchet being necessary to keep it in position. Now when the slack-arm is revolved from position 0 to position 2 (a half-revolution) the eight inches of slack have been taken up, and thereafter the chain is wound around the staff at a high and constant leverage; but since a saving of motion, and consequently of time, is the primary purpose of this improvement a better construction is preferred, which consists in automatically preventing the slack-arm b from turning to its natural position 0. I shall therefore assume position 1 to be the most advantageous and that it is at right angles to position 2. Then if it is desired to remove eight inches of slack the hook t is placed in that adjusting-hole s in the slack-arm b eight inches from the center of the staff a, and by this arrangement the objectionable slack in the connections is removed by a quarter-revolution of the staff, after which the chain is wound around the staff, as previously stated, for the production of a higher leverage. In service it is found that with the slack-arm b set at position 2 an ordinary hand chain-brake can be fully applied by about a half-turn of the brake-staff, which would place slack-arm b at the end of its excursion in approximately position 3. By a variation of the working length of the slack-arm b any reasonable slack may be removed by any desired arc of excursion less than a half-circle, the idea being to use the shortest arc practicable. Another advantage in this construction is that the operator always knows the exact excursion of brake-handle to set his brake. On releasing the brake the slack-arm b is caused to regularly stop at any desired point between positions 0 and 2, according to the angular adjustment between the center line of the slack-arm b and the face of the enlarged tooth on ratchet-wheel c or by the placing of the dog. In practice the release of the brake is accomplished by a push on brake-handle, which throws the dog slightly beyond the radius of the small ratchet-teeth, though not so far but that it will engage with the enlarged tooth.

In Fig. 3 a combination of parts is so arranged that any required multiplication of the brake-staff leverage may be applied to the winding-spindle. Provision is also made for two connecting-chains for purpose of safety. The slack-arms b and b' appear on the opposite side of spindle than as shown in Fig. 2, because the motion has been reversed by the inserted gearing. In this application the ratchet-wheel c will therefore also face in the opposite direction. The duplicate slack-arm $b'$ may also be used upon the simple brake-staff shown in Fig. 2.

That which I claim as my invention, and desire to secure by Letters Patent, is—

1. In a winding device, the combination of a revolving spindle or drum, an arm projecting from the surface of said spindle or drum a flexible connection adjustably attached to said projecting arm, a ratchet-wheel having an enlarged tooth $d$, said ratchet-wheel being so attached to said spindle that when said enlarged tooth is in engagement with its dog $e$ the projecting arm $b$ shall make any desired angle to the direction of the required application of force, substantially as described.

2. In a winding device, the combination of a revolving spindle or drum, an arm projecting from the surface of said spindle or drum, a flexible connection attached to said projecting arm, a ratchet-wheel with an enlarged tooth suitably attached to said spindle, a dog engaging with said ratchet-wheel, said dog being held in desired position by a spring $g$ substantially as described.

3. In a braking device, the combination of a hand-crank, a brake-staff, a projecting arm attached near the lower end of said staff, a flexible connection adjustably attached to said arm, a ratchet-wheel with an enlarged tooth suitably attached to said staff, so that when enlarged tooth is in engagement with its dog, the said attached arm shall make any desired angle with the line of required application of force, substantially as described.

4. In a braking device, the combination of a hand-crank, a brake-staff, a pinion attached to the lower end of said staff, a gear-wheel engaging in said pinion, a spindle supporting said gear-wheel, a projecting arm attached to said spindle, a flexible connection adjustably attached to said arm, a ratchet-wheel having an enlarged tooth mounted upon said spindle in such a manner that when a dog engages with said enlarged tooth, the attached arm shall make any desired constant angle with the line of required application of force, substantially as described.

Signed at New York, in the county of New York and State of New York, this 27th day of November, A. D. 1899.

HUGH H. ABERNATHY.

Witnesses:
 WINFIELD H. SNYDER,
 M. W. ALLEN.